United States Patent [19]

Schumacher et al.

[11] 4,263,196

[45] Apr. 21, 1981

[54] HIGHLY FILLED THERMOPLASTIC COMPOSITIONS PREPARED WITH FINE PARTICLE SIZE FILLER

[75] Inventors: Frederick G. Schumacher, Wilmington, Del.; Walter Yllo, Carneys Point, N.J.

[73] Assignee: E. I. Du Pont de Nemours and Company, Wilmington, Del.

[21] Appl. No.: 52,927

[22] Filed: Jun. 27, 1979

[51] Int. Cl.$^3$ ............................................. C08K 5/01
[52] U.S. Cl. .................. 260/33.6 UA; 260/28.5 AV; 260/42.43; 260/42.52
[58] Field of Search .............. 260/33.6 UA, 28.5 AV, 260/42.52, 42.43; 428/95, 96

[56] References Cited

U.S. PATENT DOCUMENTS

| | | | |
|---|---|---|---|
| 3,010,899 | 11/1961 | Boyer | 252/29 |
| 3,203,921 | 8/1965 | Rosenfelder | 260/42.43 |
| 3,379,193 | 4/1968 | Monaghan | 128/136 |
| 3,497,375 | 2/1970 | Rundle | 117/5.1 |
| 3,684,600 | 8/1972 | Smedberg | 156/72 |
| 3,904,456 | 9/1975 | Schwartz | 260/42.11 |
| 3,940,525 | 2/1976 | Ballard | 428/97 |

FOREIGN PATENT DOCUMENTS 2,319,431  10/1973  Fed. Rep. of Germany .

*Primary Examiner*—Melvyn I. Marquis

[57] ABSTRACT

Highly filled thermoplastic compositions of improved characteristics useful as sound-deadening sheeting for automotive carpet are obtained by blending about 5–50% by weight of an ethylene interpolymer, such as ethylene/vinyl ester, ethylene/unsaturated mono- or dicarboxylic acids or esters of said unsaturated acids, etc.; about 2–15% by weight of processing oil; and about 50–90% by weight of fine particle size filler. Pellets prepared from these compositions remain free flowing even after storage under load.

23 Claims, No Drawings

HIGHLY FILLED THERMOPLASTIC COMPOSITIONS PREPARED WITH FINE PARTICLE SIZE FILLER

BACKGROUND OF THE INVENTION

2. Field of the Invention

The invention relates to highly filled blends and, more specifically, it relates to highly filled blends of ethylene interpolymers modified with processing oil containing fine particle size filler.

2. Description of the Prior Art

The use of processing oils with natural rubber or synthetic rubber-like compounds containing sulfur, accelerators, carbon black and other additives customarily used in the rubber industry is well known. In some instances in order to obtain very high tensile strength values, fillers are omitted. On the other hand, it is known that styrene/butadiene rubber (SBR) compounds, such as are used to adhere jute secondary backings to carpets, can readily hold up to 80% by weight or more of calcium carbonate filler. Vulcanization or curing enhances blend strength.

For thermoplastic elastomeric uses it is desirable both to avoid curing and to employ fillers to reduce blend costs, as well as to increase blend density.

Binary blends of ethylene/vinyl acetate (EVA) copolymer with filler are known as articles of commerce. The practical limit for addition of a filler such as the more commonly employed medium density fillers, e.g. $CaCO_3$, bauxite, gypsum, etc., is about 60% by weight, even when using a relatively low melt index (higher molecular weight) resin, or softer, higher vinyl acetate grades. As filler levels rise, other properties suffer, such as melt index (as it drops, extruder pressures mount rapidly), softness (the "hand" becomes much stiffer), and elongation (which drops alarmingly). Ultimately, at about the 70% filler level, it is not possible to compound binary EVA/Whiting (naturally occurring ground limestone, $CaCO_3$, from Georgia Marble Company) blends as the mixture will no longer "flux" in a Banbury Mixer (the charge merely stirs—the resin will not "work" as the blades turn, no power rise ensues, the mixture on discharge is still discrete EVA pellets in a powdery Whiting mass). If one were to use a very dense filler, such as $BaSO_4$, approximately 10% by weight more filler can be added to binary EVA blends.

Industrial noise and its control are items of increasing concern to governmental, environmental, and industrial organizations. Governmental agencies are establishing noise limits to which workers may be exposed to protect their health.

From an aesthetic standpoint, noise also presents problems. Advertisements for "quiet riding" automobiles are ubiquitous. Manufacturers are attempting to make other vehicles quiet as well—including campers, trailers, buses, trucks, and off-road-use farm vehicles.

It has long been known that interposing mass between a sound source and the area to be kept quiet is an effective means for attaining sound deadening. A stone wall is extremely effective—but is not often practical. A sheet of lead is thin, flexible, often highly effective, but costly. The challenge, then, is to attain a dense, thin, flexible sheet which can be interposed between a source of noise and the area to be quietened.

Sheets of thermoplastics or of rubberlike materials have long been used as sound-deadening means. To make the sheets flexible, dense, strong, and inexpensive has posed a challenge to compounders for many years. For some uses, such as automobile carpet underlayment, the sound-deadening sheet must also be moldable.

Schwartz U.S. Pat. No. 3,904,456 is related to a method for inhibiting transmission of airborne noise by interposing in the air space between the noise source and the location to be insulated a thin, dense normally self-supporting film or sheet composed essentially of from about 10 to about 40% by weight of ethylene/vinyl acetate copolymer having an average vinyl acetate content of from about 10 to about 42% by weight and a glass transition temperature of at least about 30° C. below the average ambient temperature in the air space, and from about 60 to about 90% by weight of inorganic filler materials, such as sulfates, carbonates, oxides, etc. of barium, calcium, cadmium, etc., effective to produce an overall density greater than at least 2 grams per cubic centimeter.

EVA copolymers have been used industrially for nearly two decades, however, they are not known to be used in conjunction with processing oils as articles of commerce. This could well be an outgrowth of the way EVA commercialization has proceeded. That is, most EVA blends are based on EVA/paraffin wax technology, where paraffin wax weight is often up to ten times the weight of the EVA present. Furthermore, despite the obvious savings inherent in using lower-cost, lower-quality waxes, such as scale wax or slack wax, all attempts to do this have failed. The reason was always the same—the oil content of the wax migrated and destroyed the effectiveness of the coating or adhesive when the oil reached the bond or sheet surface. Thus, compounders "knew" that oil could not be used in EVA blends and technology developed along other lines.

Rundle U.S. Pat. No. 3,497,375 discloses coating compositions for wooden concrete molds consisting of ethylene/vinyl acetate copolymer and paraffinic oil. There is no filler employed in the coating compositions of this patent.

Monaghan U.S. Pat. No. 3,379,193 discloses teeth covers made of ethylene-vinyl acetate copolymer in itself or in combination with mineral oil and, if desired, with fibers and coloring materials. The preferred formulation is disclosed to be 47% by weight of ethylene-vinyl acetate copolymer, 47% by weight of mineral oil, 5% by weight of nylon fibers, and 1% by weight of titanium dioxide.

German Patent Application No. 2,319,431 discloses sound deadening composites suitable for use in automobiles which consist of a highly filled polymer sheet (for example, 300–1200 or even up to 1500 parts of filler per 100 parts of polymer) which on its backside is provided with a filler material sheet, e.g., a polymer foam. Suitable polymers for use are disclosed to be terpolymers of ethylene, propylene and a non-conjugated diene (EPDM), polyvinyl chloride (PVC), mixed polymers of ethylene and vinyl acetate (EVA), styrene-butadiene mixed polymers (SBR) and mixtures of these materials with thermoplastic polymers, such as polystyrene and polyolefins.

Boyer U.S. Pat. No. 3,010,899 discloses blends of ethylene/vinyl acetate resin and mineral oil which are either rubbery or grease like depending upon the proportion of oil to resin and can be used as a substitute for crepe rubber or as a grease. It is further disclosed that fillers such as carbon black or finely divided clays can be added to the rubbery products to increase hardness and produce materials suitable as floor tile. As indicated for example in Claim 11, the filler, carbon black, is present in a "minor amount" while the oil-ethylene/vinyl acetate copolymer mixture is present in a "major amount". In Example 2 an oil+resin/carbon black ratio of 4 parts by weight to 1 part by weight is indicated.

Rosenfelder U.S. Pat. No. 3,203,921 discloses the use of compositions consisting essentially of 73-88% by weight of a homo- or copolymer of ethylene (which can be ethylene/vinyl acetate or ethylene/ethyl acrylate copolymer), 2-7% by weight of an aliphatic paraffinic hydrocarbon mineral oil and 10-20% by weight of a mineral filler, (for example, calcium carbonate, barium sulfate, etc.) for preparing blow-molded objects such as dolls.

According to co-pending patent application Ser. No. 963,111, filed Nov. 22, 1978, there is provided a composition consisting essentially of (a) from about 5 to about 50% by weight of at least one copolymer of ethylene; (b) from about 2 to about 15% by weight of processing oil; and (c) from about 50 to about 90% by weight of filler.

SUMMARY OF THE INVENTION

According to the present invention, there is provided a composition consisting essentially of (a) from about 5 to about 50% by weight of at least one copolymer of ethylene with at least one comonomer selected from the group consisting of vinyl esters of saturated carboxylic acids wherein the acid moiety has up to 4 carbon atoms, unsaturated mono- or dicarboxylic acids of 3 to 5 carbon atoms, and esters of said unsaturated mono- or dicarboxylic acids wherein the alcohol moiety has 1 to 8 carbon atoms, the ethylene content of said copolymer being at least about 60% by weight, the comonomer content of said copolymer being from an amount sufficient to provide the desired oil compatibility and blend elongation to about 40% by weight, and the melt index of said copolymer being from about 0.1 to about 150, provided that when said copolymer of ethylene is an ethylene/vinyl ester copolymer said copolymer can contain up to about 15% by weight of carbon monoxide or sulfur dioxide; (b) from about 2 to about 15% by weight of processing oil; and (c) from about 50 to about 90% by weight of filler having sufficiently fine particle size to enable production of a smooth, continuously extruded sheet, strand, or tube, substantially free of melt fracture and such that when said strand is pelletized it yields pellets that are free flowing.

Further provided according to the present invention are the above compositions in the form of a sound deadening sheet.

Still further provided according to the present invention are carpets and especially automotive carpets having a backside coating consisting essentially of the above compositions.

As used herein the term "consisting essentially of" means that the named ingredients are essential, however, other ingredients which do not prevent the advantages of the present invention from being realized can also be included.

DETAILED DESCRIPTION OF THE INVENTION

Surprisingly, it has been discovered that when a superfine filler is used in compounding highly filled processing oil modified thermoplastic compositions, rather than the coarser-ground fillers generally employed for products of this type, the following benefits result:

1. Particles of the product are smoother following extrusion of strands and cutting into pellet form.
2. The bulk density is increased.
3. The smooth pellets hold very little water and thus are easily dried. Comparatively little energy input is needed to dry smooth pellets.
4. The pellets which have a smooth surface do not "bridge," and hence will flow much faster under equal handling stress than do pellets which have rough surfaces.
5. As a result of the above, manufacturing rates can be improved, energy input needed to dry off pellets is reduced, and need for added labor to unload rail cars is avoided or sharply lowered.
6. It is anticipated that extrusions in other than round strand form will also benefit substantially from a smooth sheet, free of melt fracture effects.

The ethylene copolymers suitable for the composition of the present invention are copolymers with at least one comonomer selected from the group consisting of vinyl esters of saturated carboxylic acids wherein the acid moiety has up to 4 carbon atoms, unsaturated mono- or dicarboxylic acids of 3 to 5 carbon atoms, and esters of said unsaturated mono- or dicarboxylic acids wherein the alcohol moiety has 1 to 8 carbon atoms. Terpolymers of ethylene and the above comonomers are also suitable. In addition terpolymers of ethylene/vinyl acetate/carbon monoxide containing up to about 15% by weight of carbon monoxide can also be employed.

The ethylene content of the copolymer is at least about 60% by weight and the comonomer content is from an amount sufficient to provide the desired oil compatibility and blend elongation to about 40% by weight. Generally from about 60 to about 95% by weight of ethylene and from about 5 to about 40% by weight of comonomer will be suitable. The preferred ethylene and comonomer level is from about 65 to about 85% and from about 15 to about 35% by weight, respectively. A mixture of two or more ethylene copolymers can be used in the blends of the present invention in place of a single copolymer as long as the average values for the comonomer content will be within the above-indicated range.

Employing a copolymer containing over 28% nonethylenic comonomer (such as vinyl acetate) results in blends that are less stiff and have lower tensile strength, while their elongation is increased. The most preferred level is about 18 to 28 weight percent. Below 18% vinyl acetate, the blends become much stiffer, lose elongation, and oil compatibility problems arise. Even blends made with nonbleeding oils become "oily" as polyethylene homopolymer is approached.

Melt index of the copolymer can range from about 0.1 to about 150, preferably from about 0.1 to about 50. Physical properties, principally elongation, decline to lower levels when the ethylene copolymer melt index is above about 30. Lower melt index ranges, about 1 to 10, are most preferred to maintain strength.

Generally from about 5 to about 50% by weight of ethylene copolymer is employed in the composition of the present invention, preferably from about 5 to about 30% by weight, and most preferably from about 10 to about 25% by weight.

In accordance with the above, suitable ethylene copolymers are such as ethylene/vinyl acetate, ethylene/acrylic acid, ethylene/methacrylic acid, ethylene/ethyl acrylate, ethylene/isobutyl acrylate, ethylene/methyl methacrylate, and ethylene/vinyl acetate/carbon monoxide. Particularly suitable copolymers are ethylene/vinyl acetate, and ethylene/ethyl acrylate copolymers.

The oil ingredient of the composition of the present invention is known as processing oil. Three types of processing oils are known—paraffinic, aromatic and naphthenic. None of these is pure; the grades identify the major oil type present.

Paraffinic oils tend to "bleed" from blends. Bleeding is normally not desirable, but could be useful in specialty applications, for example, in concrete forms where mold release characteristics are valued.

On the other hand, naphthenic and aromatic oils are nonbleeding when used in proper ratios and are thus preferable for uses such as automotive carpet backsize.

Processing oils are also subdivided by viscosity range. "Thin" oils can be as low as 100-500 SUS (Saybolt Universal Seconds) at 100° F. (38° C.). "Heavy" oils can be as high as 6000 SUS at 100° F. (38° C.). Processing oils, especially naphthenic and aromatic oils with viscosity of from about 100 to 6000 SUS at 100° F. (38° C.) are preferred.

The amount of oil present in the composition of the present invention is from about 2 to about 15% by weight, preferably from about 4 to about 12% by weight. Most preferably when using a filler of medium density, such as calcium carbonate, the amount of processing oil is from about 5 to about 10% by weight, and when using a filler of higher density, such as barium sulfate, the amount of processing oil is from about 3 to about 10% by weight.

Addition of processing oil in an amount of less than about 2% will not have a significant effect. Processing oil in the amount of in excess of about 10% will cause the melt index to rise rapidly and the blend to become much softer. At extremes, for example, at 70% filler, over 15% oil and less than 15% EVA, the oil content overwhelms the blend as the amount of EVA present is not adequate to provide "guts" for the blend.

Table I shows the effect of the type of oil selected upon an important property of the final blend; i.e., does oil exude from the blend or does it stay bound firmly within the compound? Table II shows how the oil exudation ratings were arrived at. Table III summarizes the composition, properties and origin of various processing oils. In the Table I comparison five aromatic oils were evaluated. All of them stayed firmly bound within the compound, even after two weeks of standing. Further, all six paraffinic oils tested showed a marked tendency to exude within a week under ambient conditions. The test specimens all showed a tendency to exude, all within a week, and, in some cases, on standing overnight.

The naphthenic oils generally showed no tendency to exude—although in a few cases some exudation was noted. Properties of oils depend upon two factors—the process and conditions used during refining and the source of the crude oil used. As examples, "Tufflo" 2000 (P) and "Tufflo" 2000 (H) are rated by the manufacturer as closely equivalent products. Nevertheless, the (P=Philadelphia) version did not bleed, but blends based on the (H=Houston) product showed a slight tendency to exude oil. Thus, the purchaser of an oil must evaluate it with care—and must work closely with the refiner to ensure constancy of quality. This is particularly true because industrially obtained processing oils are not "pure" in that they nearly always contain more than one type of oil. For example, an "aromatic" oil contains predominantly aromatic ring structures but also usually contains substantial proportions of naphthenic rings. Similarly, some naphthenic oils contain paraffinic oil as well. Relative proportional shifts among the oil types will, of course, change blend performance.

This is not to say that bleeding of oil, per se, is inherently good or bad. For most uses, bleeding is not acceptable and must be avoided. However, in other cases, e.g., a release coating or film intended for application to a concrete mold or form, a migration of traces of oil could prove desirable in avoiding adhesion of the curing concrete to the form.

The comments above apply to smooth pressed sheets, made with a high surface sheen, as would be produced in industry by a conventional combination of an extruder plus a set of polished finishing rolls. The detection of exudation tendency of degree is much more difficult, if not impossible, to observe when sheets with rough surfaces are used.

TABLE I

| Excudation Rating As A Function Of Type And Source Of Oil | | |
|---|---|---|
| Ingredients: | EVA #1[(1)]EVA #5[(2)](50/50)—16% by wt. | |
| | Oil to be tested —9% by wt. | |
| | Filler-No. 9 Whiting* —75% by wt. | |
| Storage Condition: | Two weeks at 72° F., 50% R.H. | |
| | Oil | Exudation Rating |
| Aromatic: | "Sundex" 790 & 8600T | None |
| | "Flexon" 340 & 391 | None |
| | "Tufflo" 491 | None |
| Naphthenic: | "Circosol" 450, 4240 & 5600 | None |
| | "Sunthane" 450 & 4240 | None |
| | "Flexon" 676; "Flexon" 766 | None; heavy, respectively |
| | "Tufflo" 500 and 2000 (P) | None |
| | "Tufflo" 2000 (H) and 6024 | Slight |
| | "Tufflo" 6204 | Heavy |
| Paraffinic: | "Sunpar" 150 & 2280 | Heavy |
| | "Flexon" 815 & 865 | Heavy |
| | "Tufflo" 60 & 80 | Heavy |

[(1)]defined in Table V
[(2)]EVA #5 = 25% VAC; 75% ethylene; 19.2 MI

TABLE II

| Oil Exudation Rating For Compositions | | | |
|---|---|---|---|
| Rating | Visual | Tactile | Absorption On Paper |
| None | No visible change | Feels dry | No transfer to paper |
| Very Slight | No visible change | Dry | Smallest perceptible oil traces on paper |
| Slight | No visible change | Borderline | Oil transfer to paper is easily noticed. |
| Moderate | Surface gloss changes noted-may look "wet" | Slippery feel but no visible transfer to fingers | Paper beneath sample is definitely wet-under entire sample area. |
| Heavy | Wet film readily noticed-oil droplets may be visible | Heavy film exists-which streaks when rubbed. Finger feels oily after test. | Paper is thoroughly wetted. Oil wicks well beyond the area in contact with the test strip. |

TABLE III
CLASSIFICATION AND CHARACTERISTICS OF PROCESSING OILS

| TRADE NAME | TYPE[1] | ASTM TYPE | SP.GR | VISCOSITY SUS[2] 100° F. | VISCOSITY SUS[2] 210° F. | CARBON ATOMS % $C_A$ | CARBON ATOMS % $C_N$ | CARBON ATOMS % $C_P$ | MOL. WT.[3] |
|---|---|---|---|---|---|---|---|---|---|
| "CIRCOSOL" 4240 | N | 103 | 0.95 | 2525 | 87 | 21 | 39 | 40 | 395 |
| "CIRCOSOL" 5600 | N | 103 | 0.95 | 5945 | 135 | 20 | 38 | 42 | 450 |
| "CIRCOSOL" 450 | N | 103 | 0.94 | 515 | 52 | 21 | 37 | 42 | 355 |
| "SUNPAR" 150 | P | 104 B | 0.88 | 500 | 64 | 4 | 27 | 69 | 530 |
| "SUNPAR" 2280 | P | 104 B | 0.89 | 2907 | 155 | 4 | 25 | 71 | 720 |
| "SUNDEX" 790 | A | 102 | 0.98 | 3500 | 85.7 | 37 | 28 | 35 | 375 |
| "SUNDEX" 8600T | A | 101 | 0.98 | — | 300 | 30 | 22 | 48 | — |
| "SUNTHANE" 450 | N | 103 | 0.93 | 502 | 52 | 15 | 43 | 42 | 355 |
| "SUNTHANE" 4240 | N | 103 | 0.88 | 2206 | 85 | 18 | 41 | 41 | 400 |
| "FLEXON" 340 | A | 102 | 0.95 | 130 | 38.7 | 31 | 41 | 28 | |
| "FLEXON" 766 | N | 104 A | 0.90 | 503 | 58.2 | 1 | 45 | 54 | |
| "FLEXON" 865 | P | 104 B | 0.87 | 332 | 43–61 | 4 | 27 | 69 | |
| "FLEXON" 815 | P | 104 B | 0.90 | 2650 | 155 | 2 | 32 | 66 | |
| "FLEXON" 676 | N | 103 | 0.93 | 1200 | 72 | 15 | 40 | 45 | |
| "FLEXON" 391 | A | 102 | 0.98 | 4010 | 92 | 28 | 43 | 29 | |
| "TUFFLO" 60 | P | — | 0.88 | 600 | 68 | 4 | 26 | 70 | 550 |
| "TUFFLO" 80 | P | | 0.90 | 2640 | 155 | 4 | 23 | 73 | 720 |
| "TUFFLO" 500[4] | N | | 0.94 | 518 | 52 | 22 | 36 | 42 | 355 |
| "TUFFLO" 2000[4] | N | | 0.95 | 2150 | 82 | 20 | 39 | 41 | 390 |
| "TUFFLO" 491[5] | A | | 0.99 | 7060 | 128 | 40 | 20 | 40 | 425 |
| "TUFFLO" 2000[5] | N | | 0.93 | 2110 | 97 | 12 | 38 | 50 | 460 |
| "TUFFLO" 6024[5] | N | | 0.89 | 175 | 43 | 1 | 50 | 49 | 345 |
| "TUFFLO" 6204 | N | | 0.91 | 1750 | 91 | 2 | 49 | 49 | |

[1] A = aromatic; N = naphthenic P = paraffinic. As classified by supplier
[2] SUS = Saybolt Universal Seconds ≅ 5 × Viscosity in centipoise (cp)
[3] as provided by supplier
[4] from Philadelphia
[5] from Houston
Source of Circosol, Sunpar, Sundex, Sunthane oils was Sun Oil
Source of Flexon oils was Exxon
Source of Tufflo oils was Arco The third essential ingredient of the composition of the present invention is the filler. The percentage of filler that can be included in the composition of the present invention on a weight basis is primarily a function of the density of the filler. Generally particle size of the filler has a minor effect on most physical properties of highly filled blends. For example, fine particle size fillers generally have a tendency to result in higher blend viscosities and they are also more expensive. #9 Whiting which has been used extensively in sound deadening compositions (about 95% through 325 mesh, maximum particle size of at least about 95% by weight is about 44 microns and mean particle size by weight is about 20 microns) often represents a viable midpoint in coarseness, availability and cost. As mentioned above and shown below, it has been found that a surprising difference can be attained by use of filler particles which are much finer than those found in #9 Whiting. Specifically, when ultrafine (paint-use) powdered filler such as "Atomite" or "Microfill #2" is substituted for #9 Whiting, the final strand (rod) or sheet-form product, upon extrusion in conventional equipment, will be smooth. Where #9 Whiting is employed, melt fracture effects can be severe. By substituting "Atomite", "Microfill #2", or an equivalently fine (paint type) filler for the coarser #9 Whiting (a caulk or putty grade, widely used also for plastics or elastomer extension), the final thermoplastic blend will exhibit little or no melt fracture, even though no other changes are made in composition or in extrusion conditions.

The particle size of the filler employed in the compositions of the present invention should be sufficiently fine to enable production of a smooth continuously extruded sheet, strand or tube, substantially free of melt fracture and such that when the strand is pelletized, it yields pellets that are free flowing.

Generally, at least about 95% by weight of the particles of the filler should have an equivalent spherical diameter smaller than about 25 microns, and at least about 50% by weight of the particles of the filler should have an equivalent spherical diameter smaller than about 12 microns. Even better surface characteristics are obtained when the above 95% and 50% diameters are smaller than about 12 and about 6 microns, respectively. Most preferred surface characteristics are obtained when the above 95% and 50% diameters are smaller than about 8 and about 3 microns.

Table IV shows detailed physical property data for many commonly used commercial fillers. The properties tabulated are based upon literature or communications from the manufacturers; but, as changes will occur due to variations in raw material sources, equipment condition, and market conditions, those who work in this field are cautioned to contact manufacturers to be certain the products of possible interest remain available and to obtain the most recently available data concerning them, or newer possibly preferable replacements.

The most preferred fillers are calcium carbonate and barium sulfate. The amount of filler present in the composition of the present invention is from about 50 to about 90% by weight, preferably from about 60 to about 85% by weight. Most preferably, when using a filler of medium density, such as calcium carbonate, the amount of filler is from about 65 to about 80% by weight, and when using a filler of high density, such as barium sulfate, the amount of filler is from about 70 to about 85% by weight.

When the ethylene interpolymer employed in the composition of the present invention is an ethylene/vinyl ester copolymer, such as ethylene/vinyl acetate, and when the filler employed in combination therewith is clay, such as "SUPREX" Clay, it is necessary to add oil to the blend in order to passivate the clay. Proper sequencing of the addition of the ingredients is necessary to attain success in the mixing operation. Sequence A, below, during intensive mixing will be successful; while Sequence B may fail if the EVA/clay mixture is heated before the clay is passivated because of the decomposition of the EVA copolymer caused by the clay. Decomposition is accompanied by liberation of anhydrous acetic acid and discoloration of the blend.

Sequence A: "X" - Clay - "Y" - Oil - Mix - EVA - Mix.
Sequence B: "X" - Clay - EVA - Mix - Oil - "Y" - Mix.

In the above illustration, "X" and "Y" may be either nothing or other fillers, diluents or resins that do not influence the otherwise probable adverse reaction of the EVA with untreated clay. The above passivation of clay, in order to enable use of substantial amounts of clay in ethylene/vinyl ester blends is the subject matter of copending patent application Ser. No. 963,112, filed Nov. 22, 1978.

Polymers, both homo- and copolymers, other than the ones referred to above, can also be used to some extent in combination with the above specified polymers without significantly interfering with the advan-

TABLE IV

Typical Physical Properties of Fillers[1]

| Filler No. | Trade Name & Supplier[2] | Particle Size Information[3] | | % on 325 Mesh |
|---|---|---|---|---|
| | | Average | Range | |
| | | (Microns) | (Microns) | |
| 1 | "Atomite" (T-W) | 2.5 | 0.5 to 10 | practically 0 |
| 2 | "Gama-Sperse" 6532 (G.M.) | 3.4 | 99.5% <12 | 0.005% max. |
| 3 | "Snowflake" (T-W) | 5.0 | 1.0 to 20 | practically 0 |
| 4 | "Duramite" (T-W) | 14 | 2.5 to 25 | practically 0 |
| 5 | "Wingdale" (G.M.) | 8.4 | 99.5% <42 | 0.2% max. |
| 6 | "Microfill" #2 (CCC) | 6.0 | 98% <30 | 2.5% max. |
| 7 | "Drikalite" (T-W) | 5.5 | 1.0 to 44 | traces |
| 8 | #9 Whiting (G.M.) | ca. 20 | — | 9.0% max. |
| 9 | "LC" Filler (G.M.) | ca. 25 to 26 | — | 15–20% typical |
| 10 | Calwhite (G.M.) | 5.4 | — | 0.008% max. |
| 11 | #22 Barytes (T.W.) | 12.0 | Up to 60 | 0.5% max |

[1] Data are based on manufacturer's literature
[2] All are ground limestone except for No. 11, which is barytes. Supplier code is:
(CCC) = Calcium Carbonate Company, Marble Falls, Texas.
(GM) = Georgia Marble Company, Atlanta, Georgia.
(T-W) = Thompson, Weinman & Company, Cartersville, Georgia.
[3] Relatively coarse fillers are generally specified by the mesh size of progressively finer screens. The finest screen size in general use is 325 mesh; finer screens "blind" easily, are hard to clean without damage, and are little used. The relationship between screen size and particle size is given below.

| U.S. Standard Sieve No. | Particle Diameter[a] in | | |
|---|---|---|---|
| | Microns | Millimeters | Inches |
| 100 | 149 | 0.149 | 0.0059 |
| 200 | 73.7 | 0.0737 | 0.0029 |
| 270 | 53.3 | 0.0533 | 0.0021 |
| 325 | 44.5 | 0.0455 | 0.00175 |
| 400 | 38.1 | 0.0381 | 0.0015 |

[a] Diameter means equivalent spherical diameter, i.e., the diameter of a sphere having the same volume as that of the particle. It is measured by standard means which are defined by the Pulverized Limestone Association.

tages obtained by the present invention. Similarly other ingredients can also be added to the compositions of the present invention by a compounder in order to obtain some desired effect, such as reduction of cost, or enhancement of physical property. Accordingly, extender resins, waxes, foaming agents, antioxidants etc. that are widely used, particularly in hot melts, can be included in the compositions of the present invention.

A commercially sized batch-type Banbury or equivalent intensive mixer is entirely suitable for preparing the compositions of the present invention. A Farrel Continuous Mixer ("FCM") is also an excellent mixing device. In either instance, dry ingredients are charged in routine fashion. It is convenient in most cases to inject the oil component directly into the mixing chamber of either unit as per widely used practice with this type of equipment. A mix cycle of about 3 minutes is generally adequate for the Banbury mixer at an operating temperature usually between 325° and 375° F. The operating rate for the FCM unit generally will fall within ranges predicted by literature prepared by the Farrel Company, Ansonia, Connecticut. Again, temperatures between 325° and 375° F. are effective. In both cases, a very low oil level, say about 2–3%, may require higher temperatures, while oil levels above about 7% may mix well at lower mixer temperatures. While not evaluated, it is expected that other devices for compounding of viscous mixes (MI of 0.1 to 20) should be entirely satisfactory—but in any case, prototype trials in advance are desirable.

Once blends are mixed, routine commercial practices may be used, such as underwater melt cutting plus drying or use of sheeting plus chopping methods, to produce a final pelletized product. In commercial practice, when #9 Whiting was used or instead a slightly coarser grade, "LC filler," was employed, we found the particles produced by a conventional melt cutter to be rough when making highly filled blends of the type described earlier. In turn, during commercial shipment, time, vibration, and pressure cause the pellets to compact and interlock, which requires added time and labor to transfer the product. Smoother pellets made from finer particle size filler do not bridge or interlock and thus are substantially free of unloading problems. A further benefit found when processing pellets of the present invention is the ease of drying the final product. Rough pellets from a melt cutting unit tend to hold substantial amount of free water in crevices. When smooth, dense pellets are produced, there is essentially no way that water can be entrained. Hence, smooth pellets can be dried rapidly with little energy input in comparison to that needed when drying rough, very wet pellets.

Similarly, when a sheeting die is used, the extrudate from blends high in filler often exhibit melt fracture. If severe enough, this can cause holes to form in the sheet. Use of ultrafine fillers combats melt fracture, thus providing greater manufacturing latitude when extruding sound-deadening or other types of sheeting.

Primary use for the compositions of the present invention will probably be in the sheeting field. Particularly for low cost, dense, sound deadening structures. Outstanding characteristics such as improved "hand", "drape", reduced stiffness, and reduced thickness of the extruded sheeting result from the compositions of the present invention.

The blends of the present invention can readily be extruded onto a substrate, such as an automotive carpet, or can be extruded or calendered as unsupported film or sheet. Depending upon the equipment used, and the compounding techniques employed, it is possible to extrude wide ranges of film thickness, from below 20 mils to above 75 mils. While not demonstrated, a film thickness of even less than 10 mils and over 100 mils could probably be readily attained. This then provides industry with an opportunity to vary the amount of sound deadening to be attained by varying film thickness, density of blends, ratio of filler load to binder, and similar techniques well known in the art.

The sound-deadening sheet produced may be used in various ways:

When applied to automotive carpet, blends described are an effective and economic means to deaden sound, while also simultaneously serving as a moldable support for the carpet.

When used in sheet form, the blends can be installed in other areas of an automobile, truck, bus, etc., such as side panels, door panels, roofing areas, etc.

In sheet form, blends may be used as drapes or hangings to shield or to surround a noisy piece of factory equipment such as a loom, a forging press, etc.

In laminated sheet form, blends, faced with another material, might be used to achieve both a decorative and a functional use—such as dividing panels in an open-format office.

In the application of the compositions of the present invention in carpets, the initial "soft" carpet manufacturing stages—tufting of loops, cutting them to form a plush if desired, dyeing and drying, and then storing as unbacked "soft" roll goods until ready to apply a backcoating—are entirely similar to well-known methods as already described in patents, e.g.,: Stahl, U.S. Pat. No. 3,645,948. The disclosure of this patent is hereby incorporated by reference.

In preparing automotive carpet backed with a sound-deadening sheet, several routes may be used. All are technically feasible. The most logical routes would be (1) and (2) below, although route (3) would also be practical and might be preferred by one who did not want to invest in extrusion equipment.

Route (1)—Prepare an automotive-type "soft" carpet by tufting, dyeing, and drying following known methods. Then, using standard extrusion coating technology, apply first a relatively fluid precoating material such as a high melt index EVA or polyethylene resin or hot melt blend in an amount sufficient to bind the individual bundles as disclosed e.g., in Example III, of the above Stahl patent, and Smedberg U.S. Pat. No. 3,684,600. Then to the still warm and still soft precoated carpet, apply the desired amount of sound-deadening hot melt blend by means of a second extruder. Standard nip roll and chill roll means are used to secure good adhesion of the main coat to the precoat and to the carpet. The thickness of the combined layers of hot melt will be selected so as to achieve the desired sound-deadening level, in addition to moldability, shape retention ability, fuzz and pill resistance, etc. as is required by the ultimate customer.

Route (2)—In place of two extruders, it is possible to use a latex precoat, followed by a drying oven, which then will ultimately be followed by an extruder to apply the sound-deadening coating. Alternatively, the precoating method taught by Smedberg, U.S. Pat. No. 3,684,600, may be employed. In either case, the extrusion step can be carried out on an in-line basis, or, alternately, the sound-deadening coating can be extruded onto the carpet in a future operation.

Route (3)—The carpet can be made and precoated as per Route (1) or Route (2) above, and then stored. Sound-deadening sheet can be made elsewhere by extrusion or a calendering process in a totally independent operation. Then, the sheet can be laminated to the carpet by preheating the to-be-mated faces of the carpet and the sound-deadening sheet by appropriate means (ovens, IR heat), and the final structure assembled. Assembly would take place through applying pressure to the mating faces, as for example, by a set of nip rolls. This technology is similar to that taught by Ballard U.S. Pat. No. 3,940,525.

Effectively, all of the routes described above would apply with equal force to the preparation of carpet for flooring uses. The final product obtained would be different from standard floor-type carpet in that it would not require a sheet of secondary jute or synthetic scrim, for reasons given above and covered in the Ballard patent. It would be different from automotive carpet primarily because of face-side styling differences.

Thus, the initial processing steps would be tufting, dyeing, drying, as described above—followed by pre-coating, as described above—followed by application of the heavy coat (sound deadening coat) as described in Routes (1)-(3) above.

The following examples are given for the purpose of illustrating the present invention. All parts and percentages are by weight unless otherwise specified.

EXAMPLES 1-9 AND COMPARATIVE EXAMPLES 1-2

These examples are summarized in Table V. Comparative Examples 1-2 show the characteristics of pellets obtained when highly filled blends are made using relatively coarse fillers.

Sample Preparation:

All ingredients were premixed in a one-gallon (about 3.8 l) can by shaking manually for about 0.5 minute. The charge was then added to a Banbury-type laboratory-sized intensive high-shear mixer. Mix conditions used were fluxing for 3 minutes at a temperature of about 325°-375° F. (about 160°-190° C.). Unless indicated specifically to the contrary, all blends made contained 72.5% of the filler to be evaluated, plus 20.2% of a blend of EVA resins and 7.3% of a process oil, as identified in Table V.

The hot, fully-fluxed blend from the Banbury mixer was then passed through a standard-type two-roll mill to form a thin sheet (thickness=about 2 to 3 mm). After cooling, the sheets in turn were reduced to small chips which could readily be fed to a conventional extruder. Our tests were made using a co-rotating twin-screw Werner-Pfleiderer extruder from which the product emerged as two about 3/16" diameter strands. These were water-cooled, and then chopped by means of a Cumberland Cutter into pellet form (right cylinders of about ⅛×⅛ inch). Before the pellets were chopped, the strands fed into the cutter were blown with a stream of low-pressure air to blow off as much water as possible. The product pellets were evaluated at once for relative degree of water content, prior to tray-drying the pellets under ambient conditions.

After drying of the pellets, their principal physical properties were evaluated:

Visual Rating of Extrudate (Strand Smoothness): This was rated visually and by touch on uncut strands. A rating of 1 means the strands are smooth, round, and essentially free of surface flaws. The surface is so smooth that water droplets are readily removable by simple means such as an air stream. A rating of 5 indicates the strands are extremely rough, jagged, and cannot be dried by a simple, quick air-blowing step. The rating system used is described in detail in Table VI.

Pellet Water Level: On emerging from the Cumberland Cutter, pellets cut from fine-filler-containing smooth strands are dry to the touch. By contrast, when a coarse filler is used, the pellets carry much free water, which wets the hands, blotting paper, etc. (see also Table V, footnote 7).

TABLE V

EFFECTS OF FILLER TYPE ON THE PROPERTIES OF EVA-BASED BLENDS[1] AT 72.5% FILLER LOADING

| Ex. No. | Filler[2] No. | Average Particle size[3] (Microns) | Visual[4] Extrudate Rating | Pour Rate[5] 68-74° F. | Pour Rate[5] 90-95° F. | Bulk Density[6] g/ml. | Visual[7] Water Level |
|---|---|---|---|---|---|---|---|
| 1 | 1 | 2.5 | 1 | 120,000 | 60,000 | 1.02 | Dry |
| 2 | 2 | 3.4 | 1½ | 120,000 | 13,300 | 0.98 | Dry |
| 3 | 3 | 5.0 | 1¼ | 80,000 | 1260 | 0.95 | —[9] |
| 4 | 4 | 14.0 | 3½ | 1180 | 29 | 0.92 | Mod.Wet |
| 5 | 5 | 8.4 | 3 | 7060 | 32 | 0.94 | —[9] |
| 6 | 6 | 6.0 | 2 | 40,000 | 286 | 0.97 | Dry |
| 7 | 7 | 5.5 | 1½ | 48,000 | 1560 | 0.97 | Damp |
| C-1 | 8 | ca. 20 | 3½ | 122 | —[8] | 0.89 | Mod.Wet |
| C-2 | 9 | ca. 26 | 5 | 3 | —[8] | 0.82 | Wet |
| 8 | 10 | 5.4 | 1½ | 4800 | 2400 | 0.93 | Damp-Dry |

TABLE V-continued
EFFECTS OF FILLER TYPE ON THE PROPERTIES OF EVA-BASED BLENDS[1] AT 72.5% FILLER LOADING

| Ex. No. | Filler[2] No. | Average Particle size[3] | Visual[4] Extrudate Rating | Pour Rate[5] 68–74° F. | 90–95° F. | Bulk Density[6] g/ml. | Visual[7] Water Level |
|---|---|---|---|---|---|---|---|
| 9 | 11 | 12.0 | 1½ | 120,000 | 10,000 | 1.22 | —[9] |

[1] All blends in this table contain:
(a) EVA #1 = 16.2%; 25% VAc; 75% ethylene; 2 MI
(b) EVA #2 = 4%; 7.5% VAc; 92.5% ethylene; 1.2 MI
(c) "Circosol" 4240-7.3%. A naphthenic processing oil available from Sun Petroleum Products Company. The composition for the oil as given by the supplier is 39% naphthenic carbon, 40% paraffinic carbon, and 21% aromatic carbon. Viscosity at 100° F. is 2525 SUS. Specific gravity is 0.9490.
(d) Filler = 72.5%
[2] Fillers are described in Table IV.
[3] Typical values from suppliers' charts or graphs. These are not specifications and thus may vary moderately from values given.
[4] For details of rating system, see Table VI. Rating of 1 is very smooth and "best"; 5 is very rough and "worst."
[5] Pour Rate is given in grams per 10 min. High values are best. See "Description of Pour Rate Test" below.
[6] Bulk density was measured by filling a 500-ml graduated cylinder to the 500-ml mark. Filling was accomplished by slow, careful pouring of the pellets into the cylinder, without vibration or tamping. Weight of pellets was measured in grams. Data were calculated in grams/ml.
[7] Visual water level: As described in more detail under "Sample Preparation," cooled strands ex the water bath are blown with an air stream to remove water before the strands are chopped. The pelllets from the Cumberland strand cutter are examined carefully for the presence of water. The ratings as used in Table V are:
Dry: The pellets are dry to the touch and will not deposit water on a paper towel.
Damp: Pellets are not quite dry to the touch and deposit only traces of water on a paper towel.
Moderately Wet: Pellets feel wet and a few water droplets will transfer readily to the hands or to a paper towel.
Wet: Pellets contain much free water, some of which can be seen with the naked eye. Water transfers in droplet form from a handful onto the hands or forms wet patches on a paper towel.
[8] Not tested; samples would surely block.
[9] No observations made.

TABLE VI
RATING OF EXTRUDATE STRAND PROPERTIES

| | | |
|---|---|---|
| 1 = | Best | = No roughness discernible to naked eye or to the touch on close examination. |
| 2 = | Very Good | = Slight roughness discernible to naked eye on close examination. Strands feel smooth to touch—but not so smooth as for a #1 rating. |
| 3 = | Fair | = Casual visual examination from close distance shows slight pock holes or ridges on extruded strands. A casual observer would readily classify strands as being rough to the touch. |
| 4 = | Poor | = Strand roughness is readily apparent to all observers at arms' length. Strands are definitely rough to the touch. |
| 5 = | Very Rough | = Strand roughness is severe and is easily detectable at a distance of 5 to 10 feet from the sample. From a close distance, the sample has sizable ridges and pock marks. The strand looks and feels much like a very coarse rat-tail file. |

Bulk Density: Rough strands cut into pellets obviously produce rough pellets which require substantial space in a container. Thus, the bulk density value for smooth pellets made from fine filler is substantially higher than that measured when the same procedure is used with rough pellets. For a valid comparison, it is essential that the pellets being compared have the same specific gravity. It is for this reason that most of our data are presented at a uniform 72.5% filler loading.

Pour Rating: When a bulk flow or pour rating test is conducted on pellets made containing fine particle size filler, the smooth pellets flow instantly from the test vessel. By contrast, as the pellet roughness is increased, the pour rate falls sharply, eventually reaching a "no-flow" condition for "Control" pellets made using the coarse-grade "LC" filler. For test details, see "Description of Pour Rate Test," given below.

Description of Pour Rate Test:

A key property of substantial importance for a bulk-shipped pelletized product is the ability of the blend to be emptied quickly and completely from a rail car. During rail car shipment, a series of events occur—all of which magnify the tendency of the contents of the rail car to "bridge" (interlock) so that it may become difficult to unload quickly, without special labor-intensive procedures:

Time alone favors tendency to "bridge"—particularly by deforming and interlacing of rough pellets.

Pressure enhances tendency to deform and interlock.

High loading temperatures will soften thermoplastic pellets, thus increasing the tendency of the lading to deform and to bridge.

Vibration during shipment will accelerate the tendency of the lading to compact, interlock, and "bridge."

As a full rail car is an impractical means to test the relative ease of handling, unloading, or storing of pellets which are subject to "bridging," a small-scale, quick test is required. A test which will do this has been devised. In brief, it consists of placing a known weight of pellets to be tested into a standardized container at a predetermined temperature, applying substantial pressure for a short time period, releasing the pressure, and determining the rate of discharge of the pellets when the can is inverted. Temperature of pellets can of course be adjusted to match precisely the conditions under which a rail car will be loaded. By applying very high pressure for a short time, the compacting tendency of a long, slow rail car shipment can be simulated.

The steps in carrying out the laboratory-scale block resistance test are:

1. Weigh 200±1 gram of pellets into a standard ½-pint paint can. (Inside diameter=2.8 in.; height=2.9 in.) The pellet temperature should be regulated in advance to a desired value by means of storage for an adequate time period in a laboratory oven. One hour preheating on a tray should suffice.
2. Quickly place 2 kg standard-type laboratory weight (diameter=2.6 in.) atop the pellet charge. This acts as a pressure distributor and transmitter—any other similar incompressible object with a diameter slightly smaller than the paint can might be used instead.
3. Place the can and the pressure transmitting weight into a standard-type laboratory press.
4. Apply 4,000 pounds of force for 15 minutes. (This is approximately 650 psi, far higher than will be encountered under routine storage conditions). As the blends are compressible, adjust the applied load to 4,000 psi at 3-minute intervals.
5. Release the pressure; remove the can; remove the weight, and gently but rapidly invert the can onto a wide-mesh (½×½ inch or larger) screen.
6. Using a stopwatch, measure the time required to empty the container—or, alternatively, for blends with a poor flow rate, measure the amount of pellets which fall from the container in exactly 10 minutes.
7. For quick and easy comparison purposes, calculate the flow rate in grams/6.2 sq. in./min.
8. If desired, then convert the flow rate to any desired system of units to simulate the exit opening from a commercial storage system.

In practice, it may be desirable, depending upon the type, size, and nature of the pelletized compound, to use a higher or lower pressure, consistently, to attain comparative results. For example, where the pellets are soft and are severely distorted or compacted by use of a 4,000-pound pressure loading, it may be desirable to sharply reduce the pressure applied. Similarly, differently sized containers may also be desirable where a closer-to-full-scale trial is of interest.

During our tests, the use of 4,000-pound pressure proved a good compromise in that very smooth pellets would not block and would pour from the container in less than one second. (Here, for convenience, we used a value of one second for calculating purposes.) Very rough blends would not flow at all—or might discharge 5 to 20 grams at the start of the maximum 10-minute test period allowed, and then stop flowing.

Note that the pellets shown in Comparative Examples C-1 and C-2 of Table V are of relatively low quality by all of the ratings described above. Visually, the strands were rated at 3.5 and 5, respectively—or poor to very rough on the scale shown in Table VI. The pour rate values are very low—and correspond on an industrial scale to samples which will barely flow from a rail car at ambient conditions and may not flow at all at temperatures of 95° F. or over. The freshly cut, rough, undried pellets hold large amounts of water, which, under commercial conditions, will require large equipment and high energy input to attain significant tonnage out-put of a dry product. A wet product is highly undesirable because: (1) Wet pellets will freeze into a monolith during wintertime rail shipment. (2) Wet pellets are notorious causes of problems upon extrusion or injection molding, and can cause personal injury or equipment damage, plus a poor-quality product. Finally, because pellets are rough, they do not "pack" well—which will require a relatively large-volume shipping container to package a fixed weight of goods.

Examples 1, 2, 3, 6, 7, and 8 show the dramatic and unexpected improvements attainable when the relatively coarse fillers used in Table V Comparative Examples C-1 or C-2 are replaced with fine fillers. By reducing the average particle size from 20–26 microns to about 2–6 microns, the following properties improve:

The extrudate roughness rating is in the range of 2 or better.

Freshly cut pellets are dry or nearly so.

Bulk density values have risen by a significant amount.

Most important, pour rates have risen to rates which are far higher than those seen for blends C-1 and C-2.

As might be expected, when filler particles of an intermediate size are selected, blend properties tend to be midrange; that is, between "best" and "poorest" values, for all properties. Behavior of this type is shown by Examples 4 and 5.

Example 9, which was made using barytes as a filler in place of the #9 Whiting used in other examples, shows properties which are significantly better than those for Examples 4 and 5. This occurs because whiting has a specific gravity value of about 2.7, while barytes has a value of about 4.5. As a result, at a concentration of 72.5% of filler by weight, the volumetric filler level is far less for the barytes-containing blend:

Whiting Blend≃52% filler by volume.
Barytes Blend≃36% filler by volume.

Thus, possible adverse effects which coarser fillers will induce will be far lessened for barytes-filled blends because surface effects are related to volume percentage of the solids in the blend, rather than to a weight percentage.

EXAMPLES 10–12 AND COMPARATIVE EXAMPLES 3–5

The benefits described above which accrue when the type of filler is changed from a coarse type to a finer grade also occur with ethylene-based resins other than those which are modified with vinyl acetate as a comonomer. Table VII shows the changes which occur when changing from coarse to fine fillers for blends which contain 72.5% of filler and 7.3% of a process oil, plus a copolymer other than an EVA copolymer. The ethylene/ethyl acrylate blends of Comparative Example 3 and Example 10 are identical in all respects, with the sole exception of the filler particle size employed. Also, the ethylene/isobutyl acrylate copolymer blends of Comparative Example 4 and Example 11 are identical in all respects, with the sole exception of the filler particle size. Finally, a third set of blends was also prepared. The ethylene/methyl methacrylate copolymer blends of Comparative Example 5 and Example 12 are alike in all respects, with the sole exception of the filler particle size. In all three of these comparative cases, based on non-EVA ethylene copolymers, the same effects are noted:

Fine filler produces a smooth extrudate strand.

Fine filler produces pellets which pour freely even after standing under load.

The bulk density value is higher when a fine filler is used.

Smooth pellets made using a finely divided filler hold very little water.

TABLE VII

EFFECTS OF FILLER PARTICLE SIZE ON PROPERTIES OF ETHYLENE COPOLYMER BLENDS AT 72.5% FILLER[1]

| Ex. No. | Copolymer[2] No. | Filler[3] Type | Visual Extrudate Rating | Pour Rate 90–95° F. | Bulk Density (g/ml) | Visual Water Level |
|---|---|---|---|---|---|---|
| C-3 | A | Coarse | 4½ | 22[4] | 0.85 | Wet |
| 10 | A | Fine | 1½ | 120,000 | 0.99 | Dry |
| C-4 | B | Coarse | 5 | 66[4] | 0.83 | Wet |
| 11 | B | Fine | 2 | 120,000 | 0.99 | Dry |
| C-5 | C | Coarse | 4 | 15[4] | 0.86 | Wet |
| 12 | C | Fine | 1½ | 120,000 | 1.0 | Dry |

[1]All blends contain:
Copolymer = 20.2%
"Circosol" 4240 = 7.3%
Filler = 72.5%
[2]Copolymer numbers are:
A Ethylene/ethyl acrylate copolymer, grade DPDA 6182NT, obtained from Union Carbide Corporation, contains about 15% ethyl acrylate, about 35% ethylene, and has a melt index of about 1.5.
B Ethylene/isobutyl acrylate copolymer, 20% isobutyl acrylate, 80% ethylene, 2.5 MI.
C Ethylene/methyl methacrylate copolymer, 18% methyl methacrylate, 82% ethylene, 2.2 MI.
[3]Coarse filler is Filler #8, Table IV. Fine filler is Filler #1, Table IV.
[4]Coarse filler samples will not flow when pour tested at 90° F.; hence, all test data for coarse filler only were developed at the much-more-favorable 68–74° F. ambient condition.

EXAMPLES 13–14 AND COMPARATIVE EXAMPLE 6

The beneficial effects of using a finely divided filler are not limited to blends which contain 72.5% filler. Table VIII shows the results secured when blends broadly similar to those of Table V are compounded using only 65% filler. When properties of the blend made for Comparative Example C-6 are compared to those of Examples 13 and 14, it is evident that the degree of improvement is strongly related to the particle size of the selected filler.

EXAMPLES 15–18 AND COMPARATIVE EXAMPLES 7–8

The preceding data are for blends made with ethylene copolymers which contain substantial amounts of comonomer. When the comonomer content is in the 18–28% range, the copolymers tend to be soft, and flow readily. At ranges from 15% comonomer and below, the polymers tend to be far stiffer. To determine whether the benefits noted earlier which accrue from the use of fine fillers also apply for blends made with stiffer resins, additional blends were made and their characteristics determined as summarized in Tables IX and X.

All blends were compounded in a laboratory-scale Banbury Mixer for convenience, as previously described, and were then processed into sheet form in a conventional two-roll mill. To make test plaques or sheets, the desired amount of blend would be weighed, placed in a laboratory-scale heated press, and pressed (between smooth release sheets of Teflon®-fluorocarbon resin) in a die of appropriate thickness. For convenience the present die had an opening of 6"×6", was cut from sheet stock of 58 or 65 mils of thickness, depending on blend density, and was charged in most instances with 63 grams of resin blend. This corresponds to 5 lbs./yd.² a commonly used sheet weight for automotive carpet use. A typical cycle was:

(1) Place a Teflon ® sheet on lower press platen or on top of a smooth steel baseplate if the platen is not truly smooth.
(2) Place an 8"×10" die plate (6"×6" opening) atop the Teflon ® sheet.
(3) Put 63 g. of resin in the cavity. (1–2 grams surplus may be needed as some blend may ooze out during pressing).
(4) Place a Teflon ® fluorocarbon sheet atop the resin. Add a smooth steel upper plate if the platen is not truly smooth.
(5) Heat the press to 175° C.
(6) When the press reaches 175° C., slowly pump the press closed to a total pressure of about 12,500 pounds (150 psi, approximately).
(7) After 2 minutes, raise the ram pressure to 50,000 pounds (600 psi, approximately), and hold the pressure and temperature constant for about 1 minute.
(8) Shut off heat and cool press to ambient temperature with ram in closed position.
(9) Release pressure, remove sample, and cut to appropriate shape for further testing.
(10) Age samples overnight at 50% RH and 72° F.

TABLE VIII

EFFECTS OF FILLER PARTICLE SIZE ON PROPERTIES OF EVA-BASED BLENDS[1] AT 65% FILLER

| Ex. No. | Filler[2] No. | Filler[3] Type | Visual Extrudate Rating | Pour Rate 90–95° F. | Bulk Density g/ml. | Visual Water Level |
|---|---|---|---|---|---|---|
| C-6 | 8 | Coarse | 4 | 1250 | 0.83 | Wet |
| 13 | 1 | Very Fine | 1¼ | 120,000 | 0.91 | Dry |
| 14 | 6 | Fine | 2¼ | 40,000 | 0.89 | Dry |

[1]All blends contain:
(a) EVA #1 = 25.0%
(b) EVA #2 = 3.5%
(c) "Circosol" 4240 = 6.5%
(d) Filler = 65.0%
[2][3]Details are given in Table IV.

TABLE IX

EFFECTS OF FINE FILLER ON THE PROPERTIES OF BLENDS BASED ON EVA HAVING LOW VINYL ACETATE COMONOMER CONTENT

| Ex.[1] | Filler No. & Type[2] | Visual Extrudate Rating | Pour Rate 90–95° F. | Bulk Density g/ml | Visual Water Level |
|---|---|---|---|---|---|
| C-7 | 8-Coarse | 2–3 | 2200 | 0.70 | Wet |
| 15 | 1-Very Fine | 1–2 | 105,000 | 0.70 | Damp |
| C-8 | 8-Coarse | 3 | 1720 | 0.74 | Wet |
| 16 | 1-Very Fine | 2 | 120,000 | 0.80 | Damp |
| 17 | 1-Very Fine | 2 | 54,800 | 0.81 | Dry |
| 18 | 1-Very Fine | 2 | 610 | 0.78 | Dry |

[1]Compositions and Blend properties are given in Table X.
[2]Fillers are described in Table IV.

TABLE X

COMPOSITION AND PHYSICAL PROPERTIES OF TABLE IX BLENDS AND SELECTED BLENDS OF TABLE V

| | EXAMPLE | | | | | | | |
|---|---|---|---|---|---|---|---|---|
| Ingredients:[1] | C-7 | 15 | C-8 | 16 | 17 | 18 | C-1 | 1 |

TABLE X-continued
COMPOSITION AND PHYSICAL PROPERTIES OF TABLE IX BLENDS AND SELECTED BLENDS OF TABLE V

| | EXAMPLE | | | | | | | |
|---|---|---|---|---|---|---|---|---|
| | C-7 | 15 | C-8 | 16 | 17 | 18 | C-1 | 1 |
| EVA #1 | — | — | — | — | — | — | 16.2 | 16.2 |
| EVA #2 | 40 | 40 | — | — | 28.5 | — | 4.0 | 4.0 |
| EVA #3 | — | — | — | — | — | 28.5 | — | — |
| EVA #4 | — | — | 40 | 40 | — | — | — | — |
| "Circosol" 4240 | 5 | 5 | 5 | 5 | 6.5 | 6.5 | 7.3 | 7.3 |
| Filler | 55 | 55 | 55 | 55 | 65 | 65 | 72.5 | 72.5 |
| Filler No. | 8 | 1 | 8 | 1 | 1 | 1 | 8 | 1 |
| Filler Type | Coarse | Very Fine | Coarse | Very Fine | Very Fine | Very Fine | Coarse | Very Fine |
| Physical Properties: | | | | | | | | |
| Melt Index[2] | 1.23 | 1.06 | 2.31 | 2.08 | 1.11 | 0.73 | 3.09 | 1.64 |
| Sp Gr of Blend | 1.46 | 1.47 | 1.47 | 1.46 | 1.66 | 1.65 | 1.83 | 1.83 |
| Tensile Strength[3] | | | | | | | | |
| PSI | 1020 | 1130 | 760 | 730 | 1130 | 1050 | 690 | 880 |
| kPa | 7030 | 7790 | 5240 | 5030 | 7790 | 7240 | 4760 | 6070 |
| Elongation, %[3] | 30 | 40 | 67 | 49 | 26 | 30 | 34 | 46 |
| Strip Thickness, | | | | | | | | |
| Mils | 75 | 75 | 72 | 73 | 66 | 67 | 59 | 60. |
| mm | 1.90 | 1.90 | 1.82 | 1.85 | 1.67 | 1.70 | 1.50 | 1.52 |
| Stiffnes of Strip[4] | | | | | | | | |
| g | 260 | 260 | 155 | 150 | 200 | 150 | 70 | 64 |
| Pour Rate 90–95° F. | 2200 | 105,000 | 1720 | 120,000 | 54,800 | 610 | 122[5] | 60,000 |

(Footnotes for Table X)
[1]EVA characteristics
1:25% vinyl acetate, 75% ethylene, MI = 2.0
2:7.5% vinyl acetate, 92.5% ethylene, MI = 1.2
3:9.5% vinyl acetate, 90.5% ethylene, MI = 0.8
4:12% vinyl acetate, 88% ethylene, MI = 2.5
Fillers are described in Table IV.
[2]Determined by ASTM Method D 1238 at 190° C.
[3]Tensile strength and elongation measurements made on Instron Tester using ASTM Method D 1708 at crosshead speed of 2 in. (5.1 cm.)/min. Samples are 0.876 in (2.23 cm.) × 0.187 in (0.47 cm.) in size, at strip thickness shown in table.
[4]Stiffness of strip measured by placing a 1 in. × 6 in. (2.54 cm. × 15.2 cm.) strip on a platform scale and measuring the force required to make the ends of the test strip meet at room temperature.
[5]Determined at 68–74° F.--not determined at 90–95° F., as blocking of the sample is predictable.

In evaluating highly filled blends, great care and good technique must be used in making all samples, as surface imperfections will cause wide variations in measurements of tensile strength and elongation.

Blends of C-7 and Example 15 are identical with the exception of fineness of filler. Both are based on a copolymer which contains only 7.5% vinyl acetate comonomer, and thus are quite stiff and hard. By contrast, EVA #1 with 25% vinyl acetate content, used as the principal resin in the blends of Table V, is flexible and will produce flexible blends as seen in Table XI.

TABLE XI

| | Stiffness[1] | Hardness[2] |
|---|---|---|
| EVA #1 | 20.7 | 36 |
| EVA #2 | 96.5 | 44 |

[1]MPa, method of ASTM D 747; psi values are 3,000 & 14,000 respectively.
[2]Shore D hardness, ASTM D 1706.

Examination of Table IX shows once again that the use of a finely divided filler yields blends which will be smoother to the eye and to the touch and thus will tend to hold less water and to have a far superior flow rate as measured by the pour rate test.

Examples 17 and 18 illustrate blends at 65% filler loading, between the earlier shown 55% and 72.5% filler contents. Since a fine filler was used, once again the pellets attained were smooth and dry. The pour rating for Example 17 is excellent; that for Example 18 is marginal. It is believed that the differences are due to use of copolymers having different vinyl acetate contents. The differences might also indicate that the pour rate test, although a useful screening test, may not be so precise as might be desired. Repetitive tests are desirable in all cases to be certain that error is not introduced in the long chain: weighing-premixing-Banbury blending-extrusion-chopping-and final testing of pellets.

Discussions to this point have stressed only the effects of fine filler on physical extrudate properties such as smoothness, tendency to hold water, relative pour rates, etc. Those who wish to secure these benefits must, of course, plan to investigate other, unrelated changes to the properties of blends which might be caused by changing the type of filler. As a guide to compounders, Table X shows for several pairs of blends from Tables V and IX the types of changes which may be expected in other properties of interest. Generally, these changes are relatively small and are beneficial.

(a) Melt Index—In all cases, use of a finer filler decreased the melt index of the blend. Thus, the use of finer filler increases blend viscosity. However, the changes which occur are relatively small and will probably be acceptable for most end users.

In the case of Examples 17 and 18, the melt index change noted reflects the lower melt index for EVA #3, vs. that for EVA #2.

(b) Blend Specific Gravity—This property is affected only by filler loading—not by the particle size of filler or change in type of EVA resin selected.

(c) Tensile Strength and Elongation—In most cases, use of a finer filler will enhance these properties by 10 to 20%, although this did not occur for Example 16 vs. C-8. This could reflect lack of sufficient mixing for sample Example 16, or could reflect an error during the tensile test procedure. In any event, the bulk of our experience indicates that it is desirable to use a fine filler where optimum tensile strength and elongation are needed. Conversely, such minor changes are probably not commercially important to most users.

(d) Stiffness and Strip Thickness—All test strips made were based on constant weight per unit area, rather than constant volume per unit area. Thus, all comparisons presented must be judged on a pair basis. When this is done, it is evident that change of filler particle size is far less important than is filler amount. Further, choice of resin is an important variable, as shown by comparison of Example 17 with Example 18—higher VAc level results in a less stiff blend, despite the use of a lower melt index copolymer.

(e) Pour Rate—The significant improvement produced by use of finer filler has been discussed in detail above. The comparisons given above provide strong reasons for a compounder to employ an ultrafine filler—but a change of this type is of necessity accompanied by adverse effects. The amount of energy input needed to make finer and finer filler grades is a significant cost item. In addition, grinding and classification equipment output falls as finer particle sizes are produced, and the ultimate customer must of course bear the investment burden required. Thus, for every product the compounder must balance the costs of a finer filler versus the benefits that will accrue. Therefore, the "best" choice of filler fineness must vary from user to user from application to application.

We claim:

1. A composition consisting essentially of (a) from about 5 to about 50% by weight of at least one copolymer of ethylene with at least one comonomer selected from the group consisting of vinyl esters of saturated carboxylic acids wherein the acid moiety has up to 4 carbon atoms, unsaturated mono- or dicarboxylic acids of 3 to 5 carbon atoms, and esters of said unsaturated mono- or dicarboxylic acids wherein the alcohol moiety has 1 to 8 carbon atoms, the ethylene content of said copolymer being at least about 60% by weight, the comonomer content of said copolymer being from about 5 to about 40% by weight, and the melt index of said copolymer being from about 0.1 to about 150, provided that when said copolymer of ethylene is an ethylene/vinyl ester copolymer said copolymer can contain up to about 15% by weight of carbon monoxide or sulfur dioxide; (b) from about 2 to about 15% by weight of processing oil; and (c) from about 50 to about 90% by weight of filler having sufficiently fine particle size to enable production of a smooth, continuously extruded sheet, strand, or tube, substantially free of melt fracture and such that when said strand is pelletized it yields pellets that are free flowing.

2. The composition of claim 1 wherein at least about 95% by weight of the particles of said filler have an equivalent spherical diameter smaller than about 25 microns, and at least about 50% by weight of the particles of said filler have an equivalent spherical diameter smaller than about 12 microns.

3. The composition of claim 2 wherein at least about 95% by weight of the particles of said filler have an equivalent spherical diameter smaller than about 12 microns, and at least about 50% by weight of the particles of said filler have an equivalent spherical diameter smaller than about 6 microns.

4. The composition of claim 3 wherein at least about 95% by weight of the particles of said filler have an equivalent spherical diameter smaller than about 8 microns, and at least about 50% by weight of the particles of said filler have an equivalent spherical diameter smaller than about 3 microns.

5. The composition of claim 3 wherein said copolymer of ethylene is present in an amount of from about 5 to about 30% by weight, said processing oil is present in an amount of from about 3 to about 12% by weight and said filler is present in an amount of from about 60 to about 85% by weight.

6. The composition of claim 5 wherein said processing oil is selected from the group consisting of naphthenic and aromatic oils.

7. The composition of claim 6 wherein said filler is selected from the group consisting of calcium carbonate and barium sulfate.

8. The composition of claim 7 wherein said copolymer of ethylene is selected from the group consisting of ethylene/vinyl acetate, ethylene/acrylic acid, ethylene/methacrylic acid, ethylene/ethyl acrylate, ethylene/vinyl acetate/methacrylic acid, ethylene/isobutyl acrylate, ethylene/methyl methacrylate, and ethylene/vinyl acetate/carbon monoxide.

9. The composition of claim 8 wherein the ethylene content of said copolymer is from about 65 to about 85% by weight, the comonomer content of said copolymer is from about 15 to about 35% by weight and the melt index of said copolymer is from about 0.1 to about 50.

10. The composition of claim 9 wherein at least about 95% by weight of the particles of said filler have an equivalent spherical diameter smaller than about 8 microns, and at least about 50% by weight of the particles of said filler have an equivalent spherical diameter smaller than about 3 microns.

11. The composition of claim 10 wherein said copolymer of ethylene is selected from the group consisting of ethylene/vinyl acetate, ethylene/ethyl acrylate and ethylene/vinyl acetate/methacrylic acid.

12. The composition of claim 11 wherein said processing oil has a viscosity of from about 100 to about 600 SUS at 100° F.

13. The composition of claim 12 wherein said copolymer of ethylene is ethylene vinyl acetate.

14. The composition of claim 13 wherein said ethylene/vinyl acetate is present in an amount of from about 10 to about 25% by weight, said processing oil is present in an amount of from about 3 to about 10% by weight, and said filler is present in an amount of from about 65 to about 85% by weight.

15. The composition of claim 6 wherein said filler has a density of from about 1.5 to about 3 g/cm$^3$.

16. the composition of claim 15 wherein said filler is calcium carbonate.

17. The composition of claim 16 wherein said copolymer of ethylene is ethylene/vinyl acetate which is present in an amount of from about 10 to about 25% by weight, said processing oil is present in an amount of from about 5 to about 10% by weight, and said calcium carbonate is present in an amount of from about 65 to about 80% by weight.

18. The composition of claim 6 wherein said filler has a density of about 3 g/cm$^3$.

19. The composition of claim 18 wherein said filler is barium sulfate.

20. The composition of claim 19 wherein said copolymer of ethylene is ethylene/vinyl acetate which is present in an amount of from about 10 to about 20% by weight, said processing oil is present in an amount of from about 3 to about 10% by weight and said barium sulfate is present in an amount of from about 70 to about 85% by weight.

21. The composition of claims 1, 2, 10, 14, 17 or 20 in the form of a sound-deadening sheet.

22. A carpet having a backside coating consisting essentially of the composition of claims 1, 2, 10, 14, 17 or 21.

23. An automotive carpet having a backside coating consisting essentially of the composition of claims 1, 2, 10, 14, 17 or 20.

* * * * *

UNITED STATES PATENT OFFICE
CERTIFICATE OF CORRECTION

PATENT NO. : 4,263,196
DATED : April 21, 1981
INVENTOR(S) : Frederick G. Schumacher and Walter Yllo It is certified that error appears in the above-identified patent and that said Letters Patent are hereby corrected as shown below:

| Column | line | |
|---|---|---|
| 1 | 7 | "1." should be -- 2. -- |
| 19 | 18 | "35%" should be -- 85% -- |
| 24 | 54 | "600" should be -- 6000 -- |
| 25 | 7 | "about" should be -- above -- |
| 26 | 9 | "21" should be -- 20 -- |
| 24 | 56 | "ethylene vinyl acetate." should read -- ethylene/vinyl acetate. -- |

Signed and Sealed this

Twenty-ninth Day of September 1981

[SEAL]

Attest:

GERALD J. MOSSINGHOFF

Attesting Officer  Commissioner of Patents and Trademarks